Feb. 15, 1966 W. E. WALTON 3,235,160
ELECTRICAL CONTROLS FOR FRICTION WELDING MACHINE
Filed Feb. 14, 1964 8 Sheets-Sheet 1
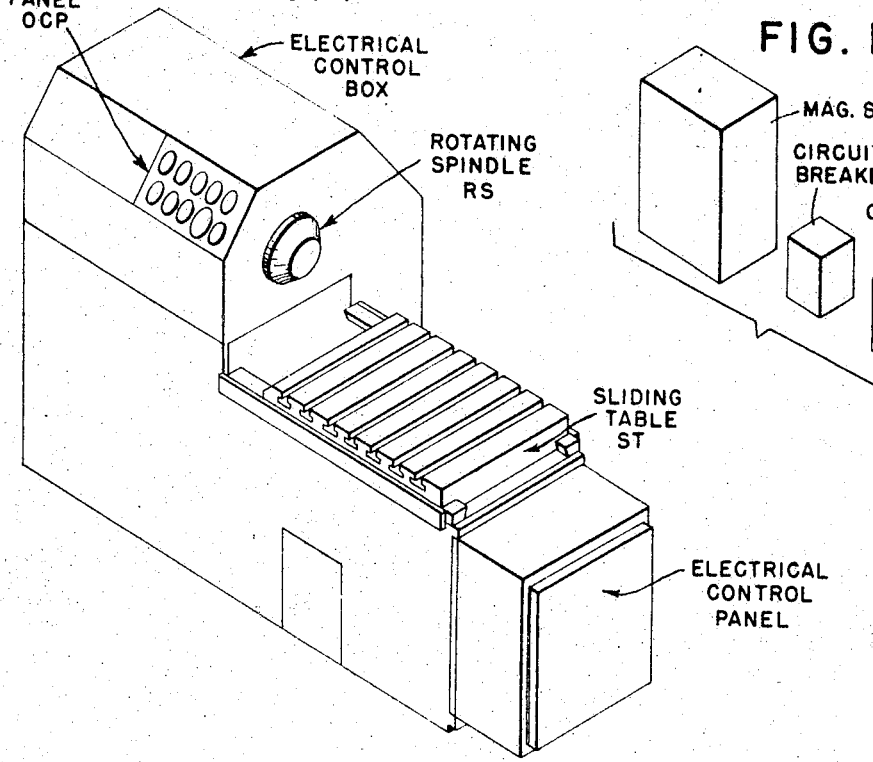
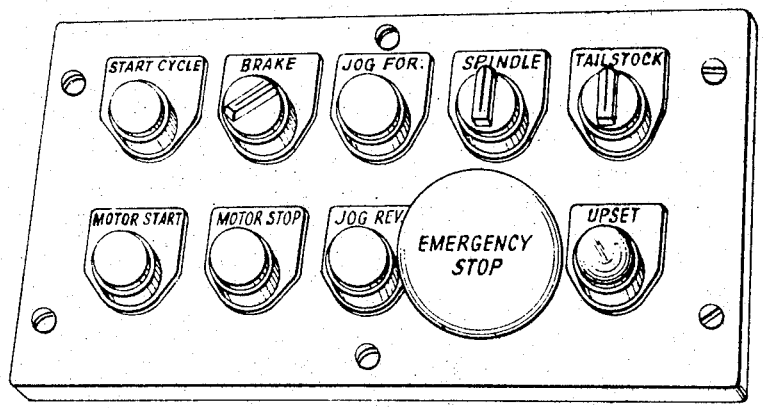
INVENTOR
WILFRED E. WALTON
BY
ATTORNEY

INVENTOR
WILFRED E. WALTON
BY
ATTORNEY

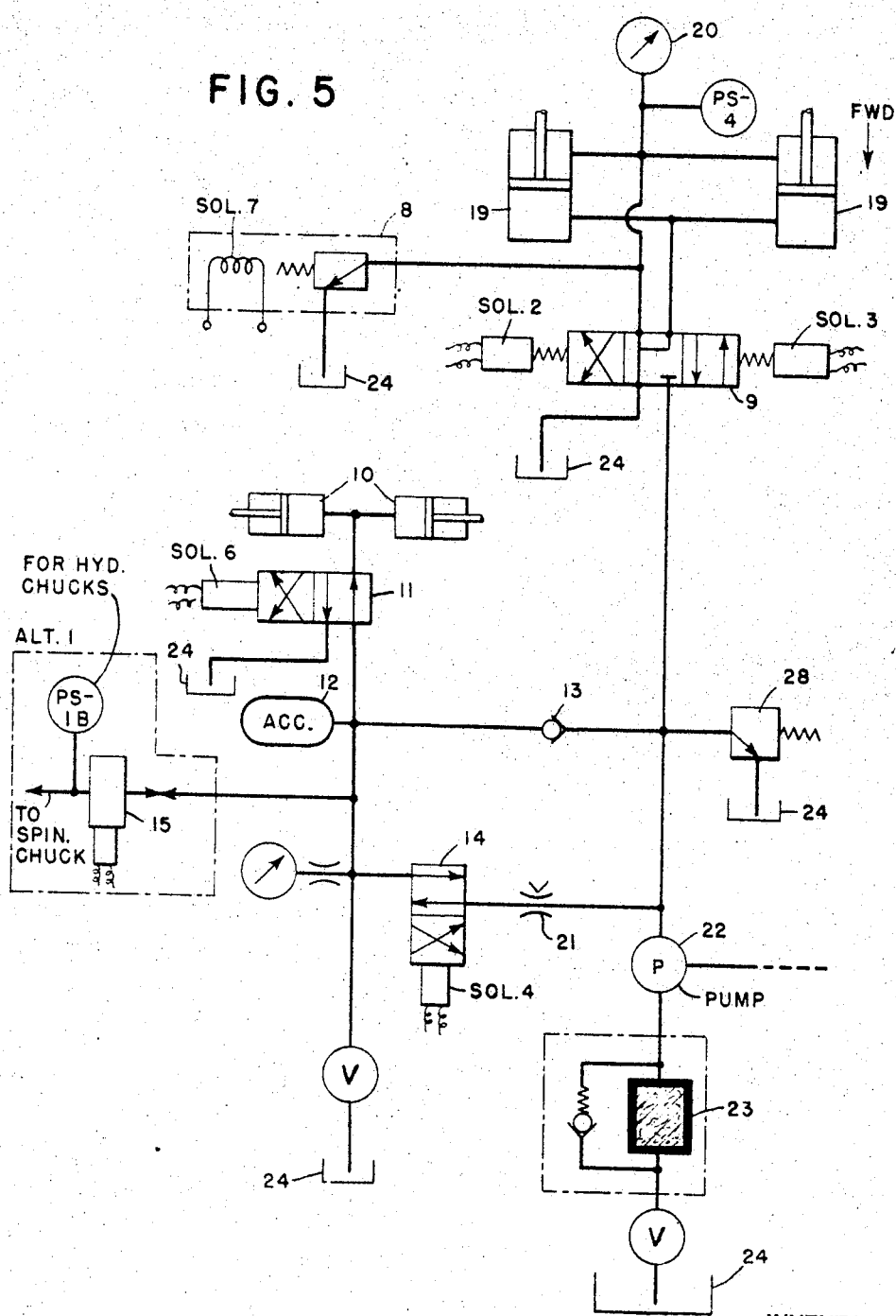

INVENTOR
WILFRED E. WALTON
BY
ATTORNEY

Feb. 15, 1966  W. E. WALTON  3,235,160
ELECTRICAL CONTROLS FOR FRICTION WELDING MACHINE
Filed Feb. 14, 1964  8 Sheets-Sheet 6

INVENTOR
WILFRED E. WALTON
BY
ATTORNEY

Feb. 15, 1966   W. E. WALTON   3,235,160
ELECTRICAL CONTROLS FOR FRICTION WELDING MACHINE
Filed Feb. 14, 1964   8 Sheets-Sheet 7
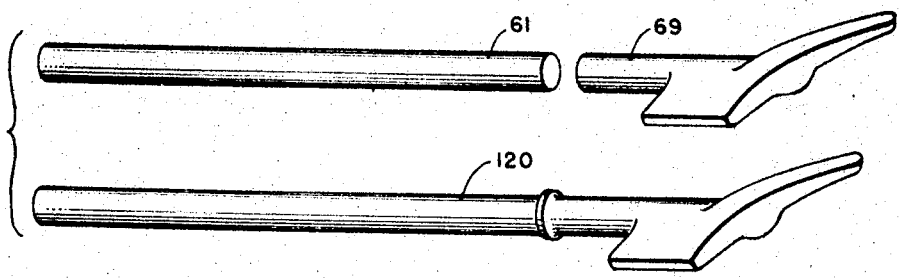
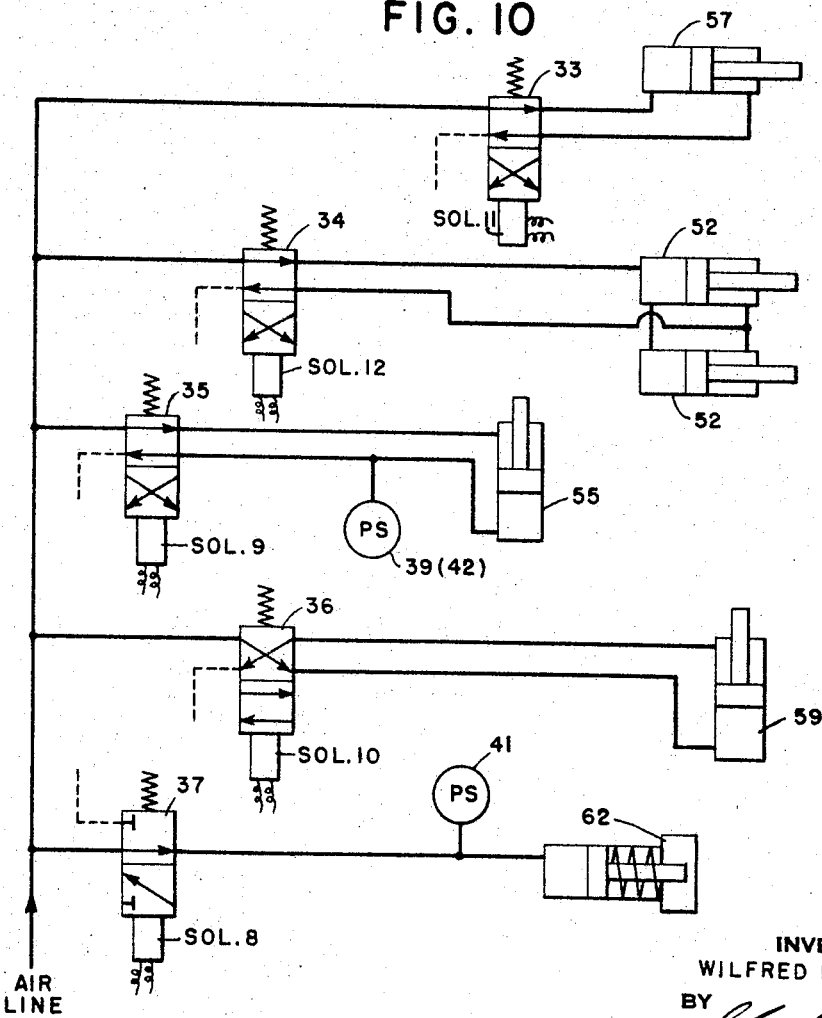
INVENTOR
WILFRED E. WALTON
BY
ATTORNEY

United States Patent Office 3,235,160
Patented Feb. 15, 1966

3,235,160
ELECTRICAL CONTROLS FOR FRICTION
WELDING MACHINE
Wilfred E. Walton, Norwalk, Conn., assignor to American Machine & Foundry Company, a corporation of New Jersey
Filed Feb. 14, 1964, Ser. No. 344,974
19 Claims. (Cl. 228—2)

The invention relates to welding systems and particularly to friction welding systems, and to the electrical and other control arrangements used in such systems.

Theoretically, friction welding is a process in which the mechanical energy of two objects revolving with respect to each other and in contact with each other is converted into thermal energy, which is utilized, instead of a separate heating source, to weld the two objects together. In practice, one of the two objects is held stationary while the other is rotated and pressed against the first object. Usually, after a specified time interval, the rotation is stopped and the pressure increased and held for another specified time period. If the operating conditions for the materials used in the objects involved are properly selected, whether they be metals, plastics or ceramics, a sound, high quality weld of the two objects is obtained. The exact pressure program used depends upon the materials in the objects and the size of the joints.

The control arrangements of the invention are particularly adapted for, although not limited to, use with a friction welding machine operated by a hydraulic system which may include a solenoid-controlled regulating valve for electrically controlling the thrust pressure applied to the object being welded, such as disclosed, for example, in the French patent to Holloway et al., No. 1,316,375, issued March 6, 1962, which includes a general description of the process used for welding large tubular objects. These control arrangements were specifically devised for use with a friction welding machine utilizing both hydraulic and pneumatic controls to be described in this application.

A general object of the invention is to control the operation of a friction welding machine in an efficient and economical manner.

A more specific object is to provide efficient and economical electrical control of the hydraulic pressure exerted on the workpieces in an automatic welding sequence of a friction welding system.

Another specific object is to automatically restore the electrical controls in a friction welder to the initial operating condition at the end of each welding cycle, and to restore the table for moving the non-rotating one of the workpieces to be welded into and out of contact with the other rotary workpiece to its loading position prior to the start of a repeat cycle.

Another specific object is to make the repeatability of the automatic welding cycle in a friction welder independent of variations in the length of individual workpieces before welding.

Another object is to control operation of the power operated chucks of a friction welding system in such manner as to prevent false operation thereof, and injury to the associated apparatus and to the user in a welding sequence.

Experimentation has shown that friction welding of metals may be improved by causing the amount of pressure applied to the materials to be joined to follow a certain time pattern in which the pressure is caused to increase linearly with time over a certain time period, hold a set level for a given time period and then assume and hold a higher level until the end of the welding process.

The friction welder in which the controls of the invention are applied employs a variable time control system or slope control unit for electrically controlling the level of hydraulic pressure exerted on the workpieces during an automatic welding cycle to obtain the above-described optimum operation by providing a series of D.C. voltages of the proper values and time sequence for controlling the operation of the control device, which may be a voltage-responsive hydraulic regulating valve, in the welder. It consists of two major parts, one of which involves preselecting voltages to be applied to the valve during preheating buildup, heating and forging phases of the welding cycle, while the second part involves gradually applying one of the selected voltages from zero to a pre-selected value, instead of suddenly switching it into effect.

The first part of the control system includes a first rectifier bridge supplied with A.C. voltage at separate times through either one of two preset variable transformers, the D.C. output of this bridge being applied to the control device by three different types of circuits in different parts of the cycle, where the switching between these circuits and the bridge connections are controlled by signals received from an external source. One of these circuits consists of a series adjustable resistor, the second consists of a voltage divider connected across the D.C. terminals of the bridge and having a portion connected across the valve, and the third consists of a direct connection across the D.C. terminals of the first bridge. The bridge rectifier may have its input A.C. voltage switched, on receipt of an externally generated command, from control of one of the first two variable transformers to the other in order to produce an abrupt change in signal to the control device required by the welding process; and simultaneously the connection of the control device may be switched from control of the divider circuit to the direct connection described above.

The second part of the control system consists of a second rectifier bridge with its A.C. voltage supplied through a third variable transformer, preset to a selected value, and its D.C. output supplying the armature of a D.C. motor, the shaft of which is connected to the shaft of the voltage divider in such manner as to cause it to be driven from one end of its travel to the other and thereby adjusting the output of the divider supplied to the valve from a minimum to maximum value while the motor moves at a rotational velocity determined by the preset value of A.C. voltage supplied to the second bridge rectifier. The motor driving the divider is equipped with limit switches cam operated by the slope drive motor to stop the motor at the extreme limits of the voltage divider and with relays to then return the divider quickly to the starting position.

One aspect of the invention resides in improvements in the above-described control system. One of the improvements is the arrangement of the voltage divider to limit the voltage applied to the control device or valve and thus limit the forward pressure to a certain value, which is a safety feature to limit heating phase pressure during "set up" and avoid damage to chucks or workpieces. A second improvement resides in the use of relay connections to provide independent adjustment of the ambient signal to the valve so that the circuit does not have to be adjusted for each selection of pre-heat level of voltage in order to provide the same current to the valve. A third improvement is the use of relay connections to obtain full voltage to the second rectifier bridge for rapid reversal and resetting of the slope drive motor, so as to avoid its "slow" return which formerly resulted in "incomplete resetting" and hence defective welds on the next cycle. A fourth improvement is the use of relay connections to cause reset of the slope drive motor, when for any reason a weld cycle is aborted after "slope start" and prior to "upset" so that the voltage divider will not be at the proper start position for the next cycle. In the event of an aborted cycle, it is usual to remove the defective weld or incompleted welded part from the chuck and in so doing the slope motor is automatically given a reset signal by these relay connections unless it is in fact already reset.

A feature of the invention is the addition of switching means for automatically resetting all control relays to their initial operating condition at the end of the automatic welding cycle, and restoring the sliding table of the welder to its loading position prior to the start of a repeat cycle.

Another feature is the utilization of a hydraulic pressure transient created by the initial physical contact of the two workpieces being welded to control the initiation of the cycle for automatic control of pressure to the weld interface, thereby making the repeatability of the cycle independent of variations in the length of the individual workpieces prior to welding; and conversely to produce welded parts of consistent length independent of variations in the cut length of the workpieces before welding.

A special feature is the provision of a special box jig type of fixture for holding one of the workpieces of irregular outline and size or configuration precluding its rotation, such as to enable loading and unloading of the friction welder efficiently within a reasonable time interval; in the interlock of this fixture with the chuck used on the spindle of the welder such that in the event of loss of electrical power or of operating pressure (pneumatic or hydraulic) the chucks will neither open nor otherwise fail to continue to supply the proper mechanical forces to the workpieces, and to stop the welding process in the event of loss of proper holding pressure in either the jig or spindle.

The above and other objects and features of the invention will be better understood from the following detailed description thereof when it is read in conjunction with the several figures of the accompanying drawings in which:

FIGS. 1, 1A are an outline perspective view of a friction welder utilizing hydraulic and pneumatic controls and associated power control apparatus, with which the control arrangements of the invention are used.

FIG. 2 is a front view of the operator's electrical control board of the friction welder of FIG. 1;

FIG. 5 shows a simplified schematic diagram of the hydraulic control circuitry used with the friction welder of FIGS. 1 and 4;

Figure 8:
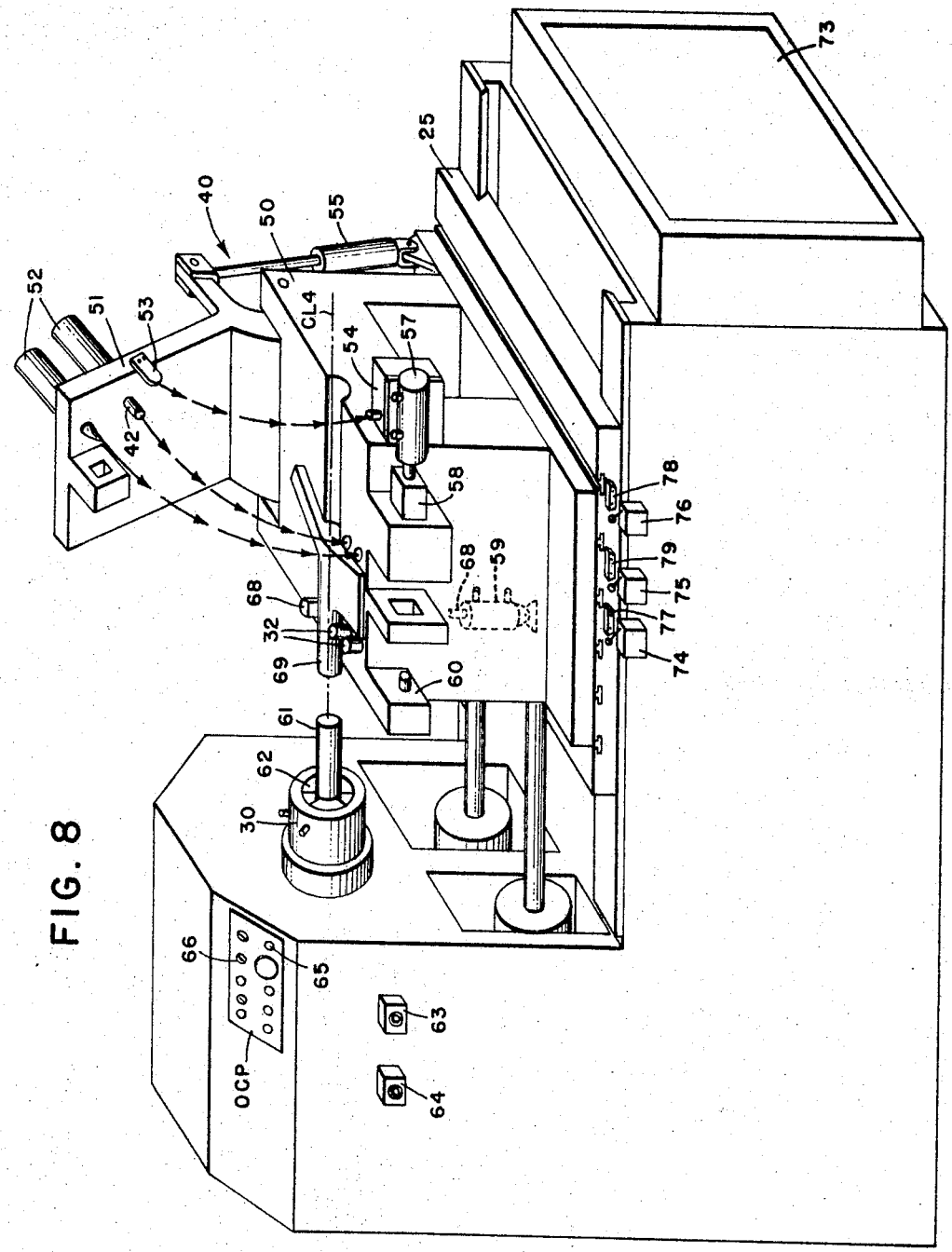

FIG. 8 shows a perspective view of one box jig type of chuck or tailstock fixture in accordance with the invention applied to the friction welder of FIG. 1, used for holding one of the workpieces to be welded with the other workpiece held in a rotatable chuck attached to the spindle of the friction welder; together with hydraulic or pneumatic controls and mechanical and electrical equipment in accordance with the invention for controlling the chucks and sliding table, chuck interlocks, loading and unloading of chucks, while providing safety to the equipment and operator;

FIG. 9 shows the workpieces held by the power actuated chucks of FIG. 8 before and after the welding operation.

Figure 11:
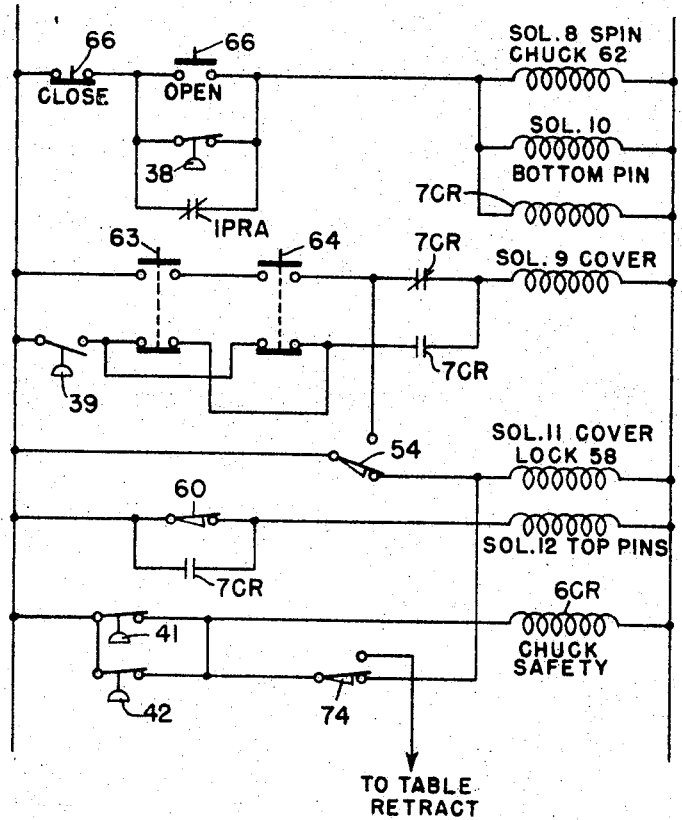

FIG. 10 is a circuit diagram of the control apparatus used in the chuck arrangement of FIG. 8 and illustrates the relationship between the electrical solenoids, the pneumatic or hydraulic valves and operating cylinders; and FIG. 11 shows the portion of the electrical schematic for the overall system dealing specifically with the operation of the chuck jig or tailstock fixture used in the arrangement of FIG. 8.

FIG. 1 shows the general configuration of the friction welder to which the control arrangements of the invention are applied. This machine briefly described consists of a very rigid frame with a specially designed heavy-duty, high-thrust rotatable spindle RS mounted at one end thereof and a sliding table ST equipped with T-slots mounted at the other end. The table ST is actuated by a pair of hydraulic cylinders located inside the frame and under the spindle RS. Hydraulic power is supplied by a pump mounted in line with the main spindle drive motor. The spindle drive motor is connected through a belt drive to a jackshaft mounted on the back of the machine frame. An air clutch, mounted on the jackshaft, connects the output drive pulley with the jackshaft thereby supplying power therefrom through a second belt to a pulley mounted directly on the spindle. A primary hydraulic brake is also mounted on the spindle to provide the rapid deceleration required for the welding process. A secondary hydraulic brake operates on the jackshaft pulley and clutch to provide adequate braking of the inertial load of the free-running portion of the clutch.

Hydraulic control valves and hydraulic circuits are mounted on brackets at the left-hand end of the machine (as viewed by the operator), while the hydraulic reservoir or sump is integral with the machine frame. A pneumatic unit, mounted beneath the table in the front of the machine, supplies filtered, lubricated air to the clutch, and filtered air at reduced pressure to the mist generator, located at the rear of the machine behind the spindle. Mist lubrication is supplied to all high-speed bearings and to the ways on which the table slides. An accumulator mounted inside the main frame supplies additional high-pressure oil for forging operations in the welding cycle, and for operation of the brakes. When hydraulic chucks are used, the accumulator supplies them with pressure in the event of a pump or power failure.

An electrical control box ECB mounted on the right-hand end of the machine houses the timers and pressure control equipment that provide the automatic welding cycle. A push-button station or operator's control panel OCP located above the spindle, within easy reach of the operator's hand, makes available to the operator all controls necessary for the normal operation of the machine. A pressure gauge mounted on the cover near the spindle nose registers the "forward" pressure supplied to the actuating cylinders. A junction or electrical connection box at the rear of the machine provides termination points for hydraulic and pneumatic valve solenoids, push button control cabling, signal circuits from the control box, and the control wiring necessary to interconnect with the wall or ceiling-mounted power units which comprise a magnetic starter, the control transformer and the control-voltage circuit breaker.

FIG. 2 shows the front view of the push-button station or operator's control panel OCP on the machine of FIG. 1. As shown, it includes a Motor Start, Motor Stop, Start Cycle, Emergency Stop, JOG FOR and JOG REV push buttons; Brake, Spindle and Tailstock switches; and an Upset incandescent lamp.

Figure 3:
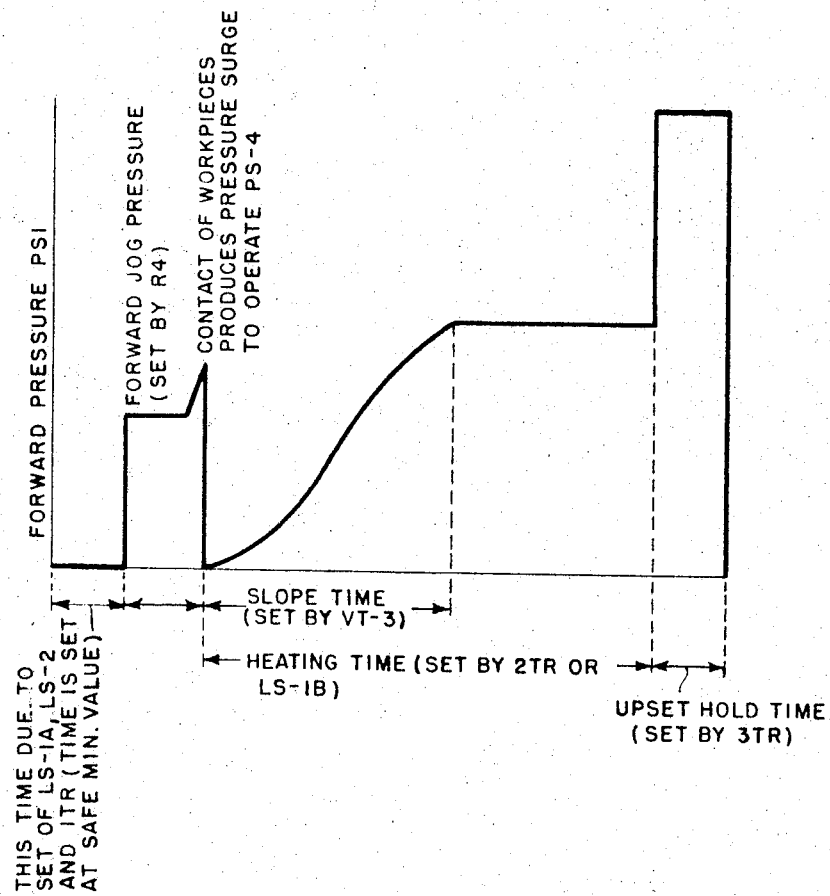
FIG. 3 shows a time pressure curve of a typical forward pressure welding cycle with automatic control for providing optimum welding operation of a friction welder such as shown in FIG. 1, with associated electrical controls for producing various operations therein in accordance with the invention, as indicated on the figure by suitable legends and reference characters.

FIG. 3 shows a time-pressure curve or a typical forward pressure cycle under automatic control with electrical control elements that must be adjusted to obtain a specific pressure-time sequence for optimum welding in accordance with the invention. These include limit switches LS-1A, LS-2 operated by cams mounted on the sliding table ST of the welding machine, and timing relay 1TR for a pressure build-up time setting; a potentiometer R4 setting the forward jog pressure; pressure switch PS-4 operated by a pressure surge; a slope time set by variable transformer VT-3; a preheat pressure control $P_1$ set by variable transformer VT-2; overall heating time set by time relay 2TR or limit switch LS-1B; an upset or final pressure level control set by variable transformer VT-1; and an upset hold time or forging pressure set by timing relay 3TR.

The control system for the friction welder of FIG. 1, which includes hydraulic, pneumatic and electrical components, will be described in connection with the simplified drawings of FIGS. 4 to 7.

Figure 4:
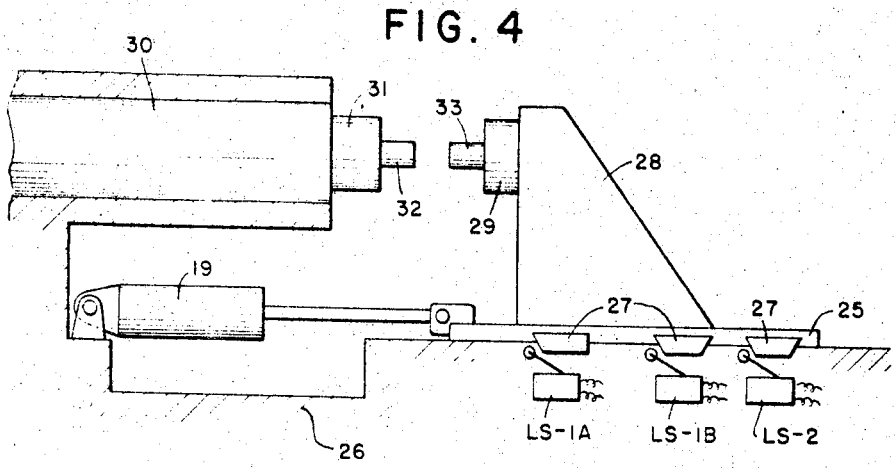
FIG. 4 shows in simplified form the basic mechanical portion of the friction welder of FIG. 1 including the chucks and sliding table and the electrical and other controls therefor.

Referring to FIG. 4, showing the friction welder in very simplified form, the basic mechanical portion thereof which is controlled includes a table 25 sliding on a frame 26 under control of the pressure cylinders 19 to bring a non-rotating workpiece 33 held in chuck 29 mounted to the table 25 by a fixture 28, and a rotating workpiece 32 held in a rotatable spindle chuck 31 mounted in the spindle 30 which is also firmly supported by the common frame 26, out of and into contact at the required pressure and for the required time intervals. Mounted on the table 25 are cams 27 used to actuate the limit switches LS-1A, LS-1B and LS-2 at selected positions of the table 25 for a purpose to be brought out later.

Referring now to FIG. 5, showing the simplified hydraulic schematic diagram, the cylinders 19 are actuated by hydraulic pressure created by a pump 22 drawing hydraulic fluid from a sump or reservoir 24 through a filter 23. The output pressure of the pump 22 is limited to a selected maximum value by a regulating valve 28, and is supplied to the pressure port of the solenoid-controlled valve 9 the spool of which, in the neutral position, blocks the pressure port and connects both ends of the cylinders 19 to the sump 24. When the solenoid SOL-3 of valve 9 is energized, the spool is moved to the left from the position shown in the figure to connect the pressure line so that it supplies pressure to the major area of the pistons in cylinders 19. This extends the associated rods, moving the table 25 (FIG. 4) away from the spindle (retract). When solenoid SOL-2 of valve 9 is energized, the spool of that valve moves from the right of the position shown in the figure causing pressure to be supplied to the minor area of the pistons in cylinders 19 causing them to contract and pull the table 25 (FIG. 4) towards the spindle (forward). When a "forward" pressure is supplied, its value may be read on gauge 20 (FIG. 5), and its maximum value at any time is determined by the level of the current in the solenoid SOL-7 of the electroilic valve 8. Valve 8 determines forward pressure, under control of electrical circuits in FIG. 7, by providing controlled flow of fluid to sump 24. Forward pressure is also applied to pressure switch PS-4 (FIG. 5) which is used to "sense" the pressure transient created when the workpieces first make contact as the table 25 (FIG. 4) is moved forward under control of the JOG FOR switch on the operator control panel OCP (FIG. 2).

Referring again to FIG. 5, regulated pump pressure is supplied through check valve 13 to the accumulator 12, to brake valve 11, to accumulator valve 14, and (when used) to hydraulic chucks (ALT-1). When the solenoid SOL-6 of brake valve 11 is energized, pressure is removed from the brakes 10 and they are connected to sump 24 through the valve. When the solenoid SOL-6 is not energized, pressure is supplied to the brakes 10 and the spindle 30 (FIG. 4) connected thereto is prevented from rotating.

When the solenoid SOL-4 of valve 14 is energized, valve 14 connects the accumulator line to the pump output, through adjustable flow valve 21 to reinforce the pump output of oil so that full required pressure may be maintained during the increment of movement of the table 25 (FIG. 4) which occurs instantaneously as the forging welding phase is carried out. When solenoid SOL-4 is not energized, accumulator pressure is blocked from valve 21 by valve 14 and from returning from the pump output line by check valve 13. When hydraulic chucks are used (ALT-1), they are supplied with hydraulic pressure by valve 15 and chuck pressure is also supplied to the pressure switch PS-1B for a purpose which will be brought out later.

Figure 6:
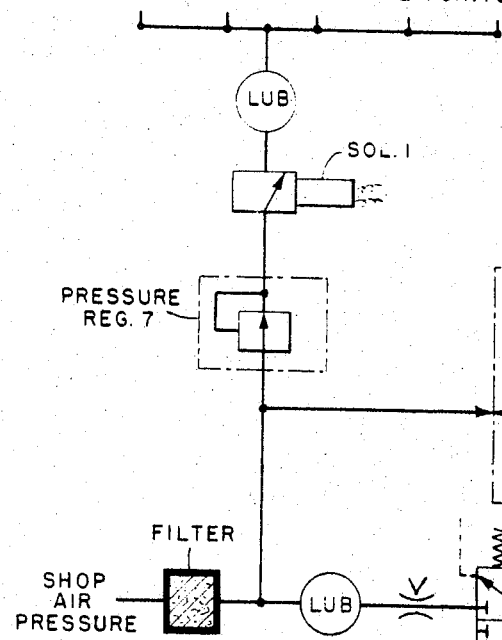
FIG. 6 shows a simplified schematic diagram of the pneumatic circuitry used with the friction welder of FIGS. 1 and 4.

Referring now to FIG. 6, the pneumatic control includes a mist lubrication generating system which lubricates the spindle, all high-speed bearings and the ways of table 25. When the solenoid SOL-1 is energized, pressure from the air supply line is supplied to the mist generating system. Also included in the pneumatic circuit is the supply to the clutch 16 to engage it. When pneumatic chucks are used (ALT-2), they are supplied with air through a valve 15. At the same time pressure would be supplied to pressure switch PS-1B.

The electrical control system of the friction welder of FIGS. 1 and 4 consists of: the power control circuitry; the control solenoids, the function of which is to control the application of hydraulic and mechanical power necessary for welding; relays which control the sequence of events, and a D.C. control system or slope control unit, which controls the level of hydraulic pressure exerted on the workpieces during the welding sequence.

Figure 7:
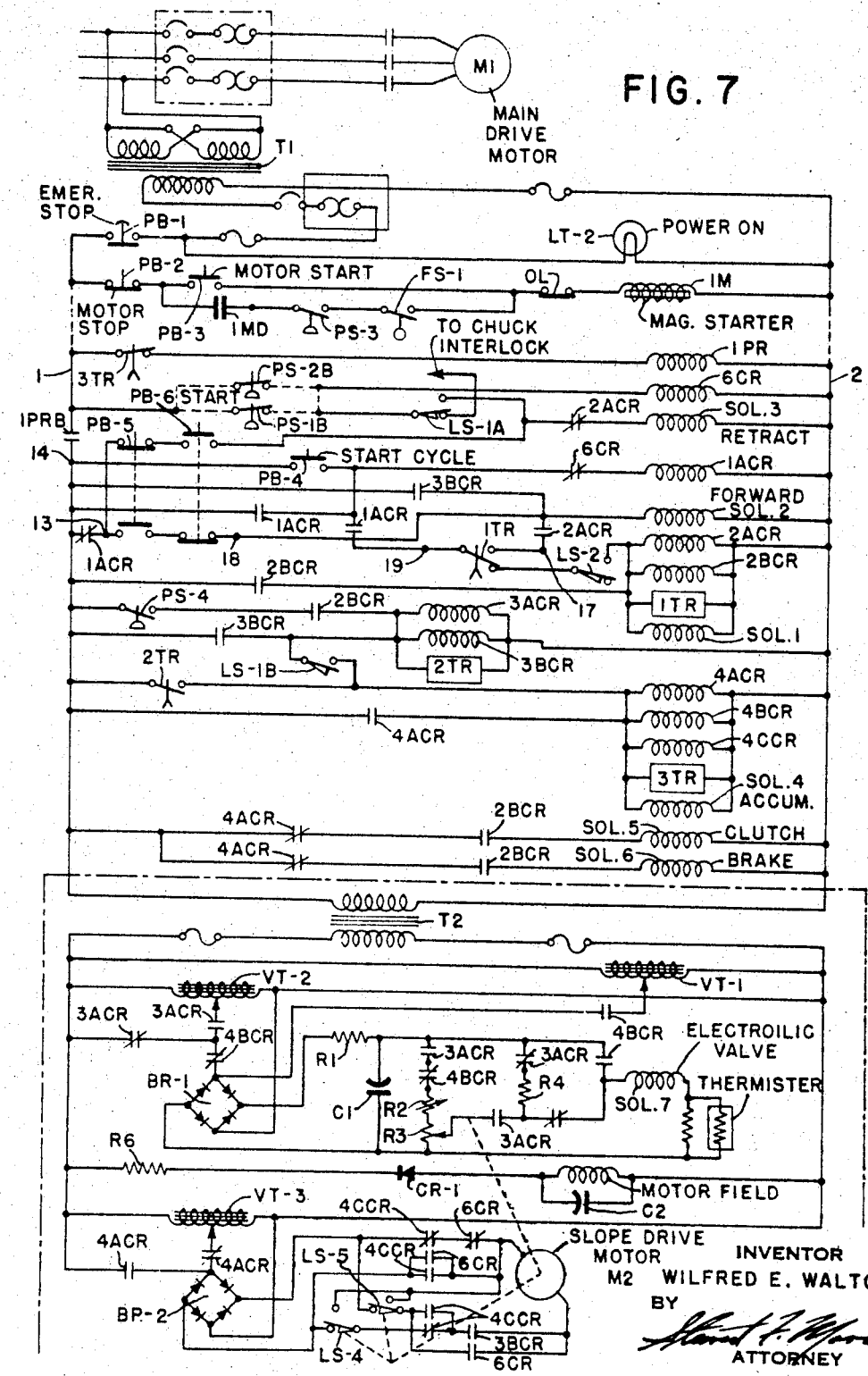
FIG. 7 shows a simplified electrical diagram of the power control circuitry and the circuits used for producing the automatic pressure cycle of FIG. 3.

The control schematic of FIG. 7 shows both power wiring and the control wiring.

POWER CONTROL CIRCUITRY AND CONTROL INTERLOCKS

Starting the main motor

Referring to FIG. 7, the main drive motor M1 is started by depressing the Motor Start push button PB-3 which picks up the contactor (the magnetic starter) to supply line voltage to the motor leads. This contactor will seal itself in through auxiliary contacts 1MD, if pressure switch PS-3 located in the air line to the lubrication system is closed indicating that the lubrication air supply is adequate, and if float switch FS-1 is closed indicating the level of oil in the lubricating system is adequate for safe operation.

CONTROL INTERLOCKS

Emergency stop button

The push-button switch PB-1, shown in series with fuses which protect the secondary of the control transformer T1, is an emergency stop button and is located on the push-button panel (FIG. 2). When momentarily depressed it removes all power from the control system and will accomplish the following: (a) de-energize the main motor contactor, (b) de-energize all relays which have been actuated by completed portions of the cycle, (c) cause the clutch to disengage and the brake to be applied, and (d) insure that the chucks remain locked by removing all voltages from the chuck control circuits. Removing voltage from the chuck solenoids, results in the continued application of hydraulic or pneumatic pressure to the chucks so that the workpieces cannot become loose in the chucks.

Power relay operation

The power relay 1PR is energized as soon as control voltage is turned on and, through its contacts 1PRB, provides control voltage for operation of all relays and the D.C. power supply. Relay 1PR is held in an energized condition through the normally closed contacts of time delay relay 3TR. The time delay relay 3TR starts timing when forging pressure is applied, and, when the weld is completed, operates to open the circuit, temporarily removing voltage from the coil of the power relay 1PR. Relay 1PR then drops out temporarily, de-energizing all relays previously operated by the cycle and thereby resetting the entire control system for the next operation. In addition, a normally closed set of contacts 1PRA operate to initiate automatic opening of both chucks as described below. Since 3TR is also reset by the opening of 1PRB, its contacts reclose, re-energizing 1PR.

Jog control

Jog control of the table 25 (FIG. 4) is provided through push-button switches (FIG. 7) which are mutually dependent in their action, i.e., one must be unoperated if the other is to be operated. A normally closed contact of relay 1ACR disables both jog circuits during automatic operation.

Chucks interlocks

Provisions are made for interlocking any chucking system using hydraulic or pneumatic power, so that pressure switches connected mechanically as illustrated by ALT–1 (FIG. 5) or ALT–2 (FIG. 6) and receiving pressure when the chucks are closed, must open contacts to de-energize relay 6CR (FIG. 7), i.e., PS–1B spindle chuck pressure switch (FIG. 5) and a similar switch PS–2B not shown in FIGS. 5 and 6, but similarly arranged in any tailstock chuck pressure circuit, have their electrical contacts in parallel with PS–1B as illustrated in FIG. 7, and in this manner hold relay 6CR energized until both chucks are receiving "closing" pressure. Safety relay 6CR has contacts in series with relay 1ACR to prevent this relay being energized with either power chuck in the operation.

Assuming both chucks are closed and the table is in proper position for loading, relay 6CR is de-energized, limit switches LS–1A and LS–1B are not operated by their cams 27, and LS–2 is in the *operated* position (FIG. 4), automatic operation is now possible.

Automatic operation

The start cycle switch PB–4 is depressed energizing relay 1ACR which "seals in," disabling the jog circuits and energizing through its own contacts 1TR and LS–2, the 2ACR, 2BCR, 1TR relays and applying air pressure to the lubrication system via solenoid SOL–1.

Relays 2ACR and 2BCR seal in through normally open contacts, disable "retract" solenoid SOL–3 through opening of normally closed contacts in series with solenoid SOL–3, engage the clutch through the closing of normally open contacts in series with solenoid SOL–5 and release the brake by the closing of normally open contacts in series with solenoid SOL–6. In addition, a set of normally open contacts between PS–4 and relays 3ACR, etc., are closed to enable the pressure switch PS–4 to initiate the operation of relay 3ACR at the proper point later in the cycle. As "forward" delay relay 1TR times out, it closes a circuit through normally open contacts of 2ACR to the forward solenoid SOL–2 causing the table to move forward. As the workpiece 33 comes in contact with the rotating workpiece 32 (FIG. 4), pressure switch PS–4 (FIG. 7 and FIG. 5) "senses" the pressure transient created by contact and closes to energize relay 3ACR, etc.

Heating phase

Relays 3ACR and 3BCR and timer 2TR are now energized. Contacts of these relays are used to "seal in" their own operation, through normally open contacts and to further seal in the operation of the forward solenoid SOL–2 through normally open contacts. A pair of 3ACR contacts switch control of the electroilic valve from resistor R4 to divider operation R3. In addition, normally open contacts initiate rotation of the slope drive motor to operate the potentiometer R3 to gradually increase the voltage applied to the coil of the electroilic valve 8 (FIG. 5), thus gradually increasing the pressure applied at the interface between the workpieces through control of pressure supplied to the cylinders 19 (FIG. 5). As heating time relay 2TR completes its timing cycle, indicating that the workpieces 32 and 33 (FIG. 4) have been in contact for a time sufficient to have heated them to the desired temperature, its normally open contacts close to energize relay 4ACR, etc.

Forging phase

Relays 4ACR, 4BCR and 4CCR are energized simultaneously with hold timer 3TR and solenoid SOL–4 of the accumulator valve 14 (FIG. 5). Contacts of the 4ACR, 4BCR and 4CCR relays perform the following functions: normally closed contacts are opened to disengage the clutch by de-energizing solenoid SOL–5 and to apply the brake by de-energizing solenoid SOL–6. Switching functions are performed in the D.C. supply circuit to apply a new predetermined pressure to the electroilic valve 8 (FIG. 5) by applying a new voltage level to its coil (solenoid SOL–7). Other contacts are used to reset the slope motor and to "seal in" this group of relays.

As upset hold timer 3TR completes its timing function, its normally closed contacts open to de-energize power relay 1PR. This action opens the contacts 1PRB between bus 1 and bus 14 thereby de-energizing all relays and solenoids connected in any manner between bus 14 and bus 2. Since at this instant, upset hold timer 3TR itself is de-energized, its contacts return to the closed position again re-energizing relay 1PR and closing contacts 1PRB, restoring power to bus 14 but leaving all relays and components in the "reset" condition.

At this point in the cycle the table is in the forward position and limit switch LS–1A (FIG. 4) has been operated by one of the cams 27 so that it is now in a position to supply voltage to the "retract" solenoid SOL–3 through the now closed NC contacts of 2ACR as soon as either pressure switch PS–1B or PS–2B closes due to the removal of operating pressure from one of the chucks. With the energizing of retract solenoids SOL–3, the table operating cylinders 19 (FIG. 5) are provided with pressure to move them to an extended position thereby pushing the table away from the spindle until the "load" position has been reached. Since it was necessary to open at least one of the chucks in order to provide a retract signal solenoid SOL–3, no danger exists that the newly welded piece will be subjected to tension forces. When the table reaches the load position, cam 27 moves away from limit swtich LS–1A (FIG. 4) allowing it to return to its normal position and stopping the retract motion of the table thereby completing an automatic cycle with the table in the correct position for reloading and with all relays reset for the next cycle. In its normal position LS–1A can supply a signal to the remaining unopened chuck to cause it to open.

Limit switch LS–1B is included for two purposes. Depending upon the adjustment of its cam 27, it may be used (a) as a safety device to operate the clutch and brake before it is possible for the chucks 31 and 29 (FIG. 4) to come in contact should the cycle time set be incorrect for the material or parts size being used or, (b) it may be used to perform the same function as timer 2TR so that the cycle progresses to the forging phase (operation of 4ACR relays), as soon as a desired overall length dimension of the welded part has been attained during the heating phase as evidenced by the relative position of table and spindle. (This assumes fixed "back up" stops are used as length reference in positioning each part in its respective chuck.)

The automatic pressure cycle as shown in the curves of FIG. 3 will now be described in more detail with reference to FIG. 7 of the drawings.

It is divided into the following 5 steps, corresponding to the different times of operations of the relays:
(1) Relay 1ACR;
(2) Relays 2ACR, 2BCR, 1TR, and SOL-1;
(3) Relays 3ACR, 3BCR, and 2TR;
(4) Relays 4ACR, 4BCR, 4CCR, 3TR, and SOL-4;
(5) Completion of cycle.

Step 1, relay 1ACR

This relay performs certain interlocking functions to prevent the chucks from being opened and the jog switches from being used. In addition, its function is to complete and seal in the circuits which start the automatic sequence of events required to execute the weld cycle. Relay 1ACR is energized by depressing START CYCLE button PB4. This will energize 1ACR only if (a) both chucks are closed, and (b) the table is in the load position, so that relay 6CR is de-energized to maintain its "normally closed" contacts in series with the coil of 1ACR in the closed condition. This double interlock in the start cycle circuit insures that the table is in the proper position and that both chucks are closed prior to initiating an automatic cycle.

When 1ACR has been energized, voltage is supplied through the normally closed contact of the forward delay relay 1TR to limit switch LS-2 and, through its normally closed contact, to point 23 to energize the "retract" solenoid SOL-3. The table will then retract until a cam thereon raises LS-2 sufficiently to actuate the switch and energize relay 2ACR.

Step 2—Relays 2ACR, 2BCR, 1TR, SOL-1

As soon as the table retracts sufficiently far enough to operate LS-2, the above relays are energized and are sealed in through a set of normally open contacts on relay 2ACR. Simultaneously, normally open contacts of 2BCR close to engage the clutch and release the brake. Relay 2ACR acts to disable SOL-3 (tailstock retract) and to enable SOL-2 (tailstock forward). Since there is still no complete circuit to energize SOL-2, no forward motion occurs until the forward delay relay 1TR times out. When this occurs, the 1TR contact closes the circuit between points 19 and 17, completing the energizing of SOL-2 and causing the table to move toward the spindle. Relay 2BCR, which was closed by the retraction of the table, now enables the pressure switch PS-4 to initiate the start of slope at the exact point when the workpieces make contact, the table now moving in the forward direction.

Step 3—Relays 3ACR, 3BCR, 2TR

When the table reaches the point where the workpieces make contact, hydraulic pressure rises rapidly, causing PS-4 to close. Relays 3ACR, 3BCR, and 2TR are energized by PS-4 and are sealed in the energized position through relay 3BCR's normally open contacts. Relay contacts on 3BCR close to start the slope drive motor M2 in its function of driving the control potentiometer R3. This action raises the voltage supplied to the electroilic valve (SOL-7). A form "C" contact on 3ACR simultaneously switches the A.C. input voltage for the D.C. power supply, from line voltage to the voltage selected on VT-2.

An additional form "C" contact on 3ACR switches the control of the D.C. level from potentiometer R4 to potentiometer R3. It also connects the brush of potentiometer R3 to the electroilic valve SOL-7. The slope drive motor continues to drive the potentiometer until the full voltage selected has been applied to SOL-7. At this time, limit switch LS-4 is actuated to stop the slope drive motor. Constant pressure is supplied to the workpieces, proportional to the constant voltage supplied by the D.C. power supply, from the time the slope drive motor reaches its upper limit until relay 2TR times out to energize relay 4ACR.

Step 4—Relays 4ACR, 4BCR, 4CCR, 3TR, and SOL-4 (accumulator)

The closing of the normally open contacts of 2TR energizes the above relays which are then sealed in through the normally open 4ACR contacts. The opening of normally closed 4ACR contacts disengages the clutch and applies the brake on the welding machine. Simultaneously, a form "C" contact of 4BCR switches the A.C. voltage to the D.C. power supply from the value set by VT-2 to that set by VT-1. In addition, 4BCR contacts switch control of the electroilic valve solenoid from the potentiometer circuit R3 and apply the new D.C. voltage directly to SOL-7, increasing the hydraulic pressure to the value selected for forging by adjustment of VT-1 ($P_2$-set).

The relay contacts 4ACR operate to apply reverse voltage to the armature of the slope drive motor M2. At the same time, a form "C" 4ACR contact switches the A.C. voltage to the motor drive rectifier from the reduced voltage preselected on VT-3 to full line voltage, for rapid reversal of the slope drive motor. The slope drive motor M2 then drives in the reverse direction until LS-5 is operated to stop its rotation. (Note: As soon as reverse rotation is initiated, motor limit switch LS-3 is restored to its normal position.)

Forging pressure is now applied at the preset value $P_2$ (VT-1), until relay 3TR times out. During this period, SOL-4 is energized to supply high-pressure oil from the accumulator. This maintains desired ($P_2$) pressure during the rapid forward motion of the table, which occurs as the material is forced out from the weld interface and the parts are upset by the action of forging pressure ($P_2$).

Step 5

When 3TR times out, it opens the circuit to relay 1PR which then opens its contacts between 1 and 14 to de-energize all of the relays concerned with the automatic cycle and restores them to their initial position, thus completing the cycle and removing forging pressure from the workpiece. At this point, the upset light, which was energized when the 4ACR, 4BCR and 4CCR relays were energized, will now go out, indicating that upset is complete and welded parts may be removed from the machine as soon as it returns to the "load" position.

Operation of the D.C. power supply

Parts of the operation of the D.C. power supply have been described above in the description of the automatic cycle, but it will now be described in its entirety in order to clarify its function and adjustment.

The D.C. power supply receives its A.C. voltage from transformer T2, which is a regulating transformer capable of putting out 108 volts on its secondary winding, while the primary voltage fluctuates from 90 to 130 volts. The secondary of this transformer supplies voltage to the variable transformers VT-2 ($P_1$-set), VT-1 ($P_2$-set), VT-3 (armature voltage/slope time) and, through resistor R6 and half-wave rectifier CR-1, to the field of the D.C. slope drive motor M2.

During jogging operations, and during table motion within the automatic cycle, prior to the time when slope has started (before relay 3ACR is energized), full line voltage from the regulating transformer T2 is supplied to rectifier bridge BR-1. The output of this bridge is applied through resistor R1 across capacitor C1 to supply the circuits feeding the electroilic valve SOL-7. The voltage is supplied to the electroilic valve SOL-7 in three different ways, depending upon the mode of operation being used. During the period when BR-1 is receiving full voltage of the regulating transformer (prior to operation of 3ACR), the electroilic valve receives voltage through series potentiometer R4 and normally closed contacts of 3ACR and 4BCR. Adjustment of this potentiometer then determines the maximum "forward"

pressure which can be delivered to the cylinders either in jog forward or in the forward cycle prior to start of slope. Retract pressure is always full system pressure.

When slope starts (relay 3ACR is actuated), 3ACR form "C" contact actuates to switch control of the electroilic valve from series potentiometer R4 to resistor R2 and potentiometer R3. These two elements act as a voltage divider whose output voltage is supplied through the 3ACR normally open contact (now closed), and 4BCR normally closed contact, to the electroilic valve. Since at the beginning of slope, this divider is in a position such that no voltage appears on the brush of R3, voltage to the electroilic valve is reduced to zero and the hydraulic pressure drops to a minimum. The voltage appearing across the output of bridge BR–1 is at this time a function of the setting of VT–2 ($P_1$-set) and, as the slope drive motor drives the brush of potentiometer R3 towards R3's upper limit, the maximum voltage ultimately applied to SOL–7 is that determined by the setting of VT–2. R2 acts to limit the divider output to approximately three-fourths the maximum voltage available from BR–1 and hence limit pressure $P_1$ to a maximum of three-fourths the system pressure.

At the end of the heating cycle, after pressure $P_1$ has been reached and held for the prescribed amount of time determined by the setting of heating time relay 2TR, the spindle is stopped and forging pressure is applied by switching the A.C. voltage applied to rectifier bridge BR–1, from the voltage preset on VT–2 ($P_1$-set), to the voltage preset on VT–1 ($P_2$-set). In addition, contacts of 4BCR disengage the voltage divider (R2 and R3), and close to connect the full output voltage of the rectifier bridge BR–1 directly to SOL–7, causing the hydraulic pressure supplied to the forward side of the pistons to jump immediately to a value proportional to the setting of VT–1.

The reversal and resetting of the slope drive motor M2 was described above in the paragraph detailing the action of the 4ACR, 4BCR, and 4CCR relays. An additional set of contacts from relay 6CR duplicates the function of the 4CCR contacts, to provide a means of resetting the slope drive motor M2 in the event that the emergency stop button has been depressed during automatic cycle, after slope has started, and before upset has occurred (before relay 4ACR can operate).

SUMMARY OF NORMAL WELDING SEQUENCE

In making a normal weld, the steps listed below are followed in the sequence presented:
(1) Start the main motor.
(2) Wait approximately 40 seconds to make sure the accumulator is filled.
(3) Turn the BRAKE switch on the control panel (FIG. 2) to the RELEASE position.
(4) Insert the workpiece in the spindle chuck and turn the SPINDLE switch in control panel to CLOSE.
(5) Insert the workpiece in the tailstock chuck or fixture and simultaneously push the two push buttons 63 and 64 (FIG. 11) located below the control panel.
(6) Depress START CYCLE button.
(7) After UPSET light on control panel goes out depress the two push buttons 63 and 64 (FIG. 11) located below the push button station and remove the workpiece. (The protector rod remains cool to the touch for several minutes.)
(8) Repeat steps 4 through 7 for each successive weld.
(9) After final weld in the lot, depress MOTOR STOP button on control panel.

When the START CYCLE button is depressed, the automatic control takes over; the spindle clutch is engaged, and sufficient time is automaticaly allowed for the spindle to reach full speed before the table advances. When the workpieces make contact, "slope control" automatically drops the contact pressure to zero, then gradually increases the pressure to heating phase pressure $P_1$. $P_1$ is held for a predetermined time and then rotation is rapidly stopped by automatic actuation of the clutch and hydraulic brakes. Simultaneously, the weld interface is subjected to the forging phase pressure $P_2$. The upset hold timer 3TR maintains this pressure for a fixed interval, during which a light marked UPSET on the control panel (FIG. 2) glows to give a warning not to attempt to remove the weldment from the fixtures.

When the UPSET light goes out and the chucks have opened, the weld is complete and maye be removed. (NOTE: The table must moved to the "load" position before the control system resets to commence another weld. In the event of an aborted weld cycle, it will be necessary to use PB66 (FIG. 11) to open the spindle chuck to cause the table to be returned to the load position to effect reset.)

Safety interlocks

Whenever possible, interlock switches have been used to prevent accidental starting of the machine when unsafe conditions exist. The chuck and fixtures have been wired in accordance with FIG. 7 so that the automatic cycle may not be operated unless two workpieces are adequately locked in proper position.

In many applications of friction welding, one of the parts to be welded will not be of a general configuration suitable for holding in a vise or chuck of standard design and consequently may best be held during the friction welding process by means of a box jig type of fixture. This is particularly applicable to situations where one of the parts is a casting or a forging or a machine part with an irregular outline and/or of a size or a configuration precluding its rotation.

Although the particular jig shown in FIG. 8 and described below together with the accompanying electrical and pneumatic circuits shown in FIG. 11 and FIG. 10, respectively, is based on a specific application to a friction welding machine which has been built and successfully operated, the principles illustrated are identical with those which will reoccur whenever workpieces of this general type are to be welded. In general, box jig fixtures will not be expected to be as complex as the one described below.

Referring now to FIG. 8, the friction welder of FIG. 1 is shown equipped with a box jig 40 consisting of a frame 50 mounted on the machine table 25, the box jig being equipped with a cover 51 containing retractable locating pins 52; a cam 53 which the cover 51 in the closed position brings in contact with a limit switch 54; the cylinder 55 to operate the cover 51; a cylinder 57 to operate a cover lock slide 58; an additional cylinder 59 operating a retractable locating pin 68; and a limit switch 60 operated by slide 58 to indicate that the slide is in the closed position. Shown also is a workpiece 61, which is held in the spindle chuck 62 mounted on the spindle 30, and a workpiece 69 which is held in the box jig 40. Switches 63, 64 and 66 control operation of the spindle chuck 62 and the jig 40. On the OCP is a lamp 65 the operation of which indicates when a welding cycle has been completed and the jig 40 may be opened. Other electrical controls for the welder are located in the box 73, while limit switches 75 and 76 are mounted on the frame and are operated by cams 78 and 79 to control operation of the table 25 under automatic conditions. Limit switch 74 operated by cam 77 is used in the circuit to return the table to the "load" position and automatically open the box jig fixture at the end of the cycle.

FIG. 9 shows the workpieces 61 and 69 prior to welding and as a single component 120 after the welding process is complete. FIG. 9 also shows the upset or increase in diameter at the weld interface after the weld is completed. It is therefore necessary that any fixture used to hold workpiece 69 during the welding process provide for passage of this upset diameter as the part is withdrawn axially after completion of the weld.

FIG. 10 shows the relationship between the electrical solenoids, the pneumatic valves, and the operating cylinders.

FIG. 11 shows a portion of the electrical schematic for the overall system. These circuits are restricted to those which deal specifically with operation of the chucks or jigs or fixtures shown in FIG. 8.

The operation of the chucking system of FIG. 8 will now be described with reference to the circuits of FIGS. 10 and 11.

Starting with the jig in the open position and the chuck in the open position pin 68 is retracted, pins 52 are retracted, the cover 51 is open, slide 58 is retracted. The table 25 is in the load position.

The operator first places workpiece 61 in the spindle chuck 62 and momentarily moves switch 66 to the closed position and then releases it. Referring now to FIG. 11, switch 66 is a switch having a neutral position to which it is returned by a spring whenever it is released and is so connected that moving it to the closed position opens the normally closed contact; opening this contact removes voltage from solenoid SOL-8 which is used to control valve 37 (FIG. 10), allowing that valve to return to the position shown and applying pressure to close the spindle chuck 62 (FIGS. 10 and 8). In addition, de-energizing solenoid SOL-8 and closing spindle chuck 62 supplies pressure to the pressure switch 38/41 (FIGS. 10 and 11). The normally closed portion of this switch 38 is shown in parallel with the normally open contacts of switch 66. Contacts 1PRA also shown in parallel with 66 and 38 are the normally closed contacts of a relay 1PR which is usually energized except for a very brief period at the end of each cycle. Consequently, at any time other than at the end of a cycle these normally closed contacts will be in the open position. Hence, the application of pressure to switch 38 causes it to open so that when the switch 66 is allowed to return to its neutral position voltage is prevented from reaching solenoid SOL-8 and solenoid SOL-8 is held in a position to cause the spindle chuck 62 to remain closed. The operation of the spindle chuck switch 66 in this manner has an identical effect on solenoid SOL-10 as well as the coil of relays 7CR, i.e., all three are de-energized simultaneously and held in the de-energized position. De-energizing solenoid SOL-10 (FIGS. 10 and 11) allows valve 36 (FIG. 10) to return to the position shown in FIG. 10 supplying pressure to cylinder 59 (FIGS. 10 and 8) in a direction to cause it to extend and raise the pin 68.

With the pin 68 (FIG. 8) in the raised position, the workpiece 69 may now be inserted in the jig 40 in such a manner that it registers against the retractable pin 68 and against fixed pins 32. These pins, in this particular application, are sufficient to align the axis of workpiece 69 with the spindle axis centerline. The operator now places his left hand on switch 64 and his right hand on switch 63 (FIG. 8) thus removing himself from the immediate area of the jig and insuring that both hands are free from the jig. Depressing these switches simultaneously completes the circuit (see FIG. 11) through the normally closed contacts of 7CR to energize solenoid SOL-9 which in turn controls valve 35 (FIG. 10) causing pressure to be applied to a cover operating cylinder 55 in a direction to close the cover and simultaneously supplying pressure to the pressure switch 39/41. This action closes the normally open portion of this pressure switch 39 (FIG. 11) and opens the normally closed portion of the pressure switch 42 (FIG. 11). Since the previous operation of the spindle chuck had supplied pressure to the pressure switch 38/41, the normally closed contacts of that pressure switch 42 (FIG. 11) are now also open and no voltage is supplied to switch 74 (FIGS. 8 and 11). In this manner, relay 6CR is de-energized and the interlocks controlled by 6CR to prevent starting a cycle with either chuck open, are removed, i.e., changed from a "no go" to a "go" condition.

As the cover 51 goes to the closed position cam 53 strikes the operator of switch 54 (FIGS. 8 and 11) moving it from its normal position to its operated position and thereby removing voltage from solenoid SOL-11 while sealing in solenoid SOL-9 and maintaining a signal to solenoid SOL-9 even though the operator releases the push buttons 63 and 64.

At this point, the operator may remove his hands from switches 63 and 64 and the cover 51 will maintain itself in the closed position with solenoid SOL-9 continuing to be supplied with voltage through limit switch 54. As limit switch 54 is operated and removes voltage from solenoid SOL-11, valve 33 controlled by solenoid SOL-11 moves to the position shown in FIG. 10 such that air pressure is applied to the cover lock cylinder 57 in the direction to close the cover lock 58. After the cover lock completes its travel, it operates limit switch 60 (FIGS. 8 and 11). The action of limit switch 60 removes voltage from solenoid SOL-12 allowing valve 34 (FIG. 10) to move to the position shown in FIG. 10 thereby supplying air pressure to cylinders 52 and moving the top pins down into place against the workpiece 69.

At this point, the operator depresses the "start cycle" button on this control panel OCP (FIG. 2) and the machine goes through its normal operation of welding the parts. As the carriage 25 (FIG. 8) moves forward, cam 77 contacts switch 74 and moves it to the operated position such that it is no longer completing a circuit to solenoid SOL-11 but instead is completing a circuit to the controls which will be used later to cause the table to retract. On completion of the welding cycle, relay 1PR, the coil of which is not shown in FIG. 11, is caused to be de-energized momentarily thereby returning the 1PRA contacts shown in FIG. 11 as normally closed to the closed position (momentarily). This action has a result identical with moving switch 66 manually to the open position, i.e., it supplies voltage to solenoid SOL-8 causing the spindle chuck to open and removing pressure from pressure switch 38, causing it to return to the closed position thereby maintaining voltage to solenoid SOL-8 and maintaining the spindle chuck in the open position. Simultaneously, the other half of the pressure switch shown as 42 in FIG. 10 and also in FIG. 11 returns to the closed position and completes the circuit through limit switch 74 to those circuits causing the table to retract. The table then retracts until cam 77 leaves switch 74 (FIG. 8), allowing switch 54 to return to its unoperated position thereby supplying a voltage to solenoid SOL-11 while causing the table 25 to cease retracting. Referring again to the point in time when the spindle chuck opens, relay 7CR is also energized and held in the energized position simultaneously with solenoids SOL-8 and SOL-10. In this manner, the energizing of solenoid SOL-10 causes valve 36 to operate and move in a direction to supply pressure to cylinder 59 causing the bottom pin 58 to retract. The energizing of relay 7CR opened the normally closed contacts through which solenoid SOL-9 was being maintained in an energized condition and closed the normally open contacts of 7CR in series with the normally closed contacts of push buttons 63 and 64. Since at this point in time, pressure switch 39 is still maintained in the closed position, voltage continues to be applied to solenoid SOL-9 through the two push buttons 63 and 64 and hence the cover remains closed until further action is taken by the operator. At the point in time where the table has been retracted to its original "load" position and switch 74 has been allowed to return to its unoperated position by cam 77, it now supplies voltage to the solenoid SOL-11 and valve 33 is now moved to the position opposite that shown in FIG. 10 or in a direction to cause the cover lock cylinder 57 to retract. The top pins 42 will already be retracted at this point due to the closing of a pair of normally open 7CR contacts which parallel switch 60 (FIG. 11). The closing of the 7CR contacts in parallel with switch 60 applied voltage to solenoid SOL–12 in a direction to operate valve 34 and retract the top pins 42. With all of these actions accomplished automatically, either with the opening of the spindle chuck or during the period while the tailstock is retracting, or at the point at which it has been fully retracted, the operator may now again depress the push buttons 63 and 64 and in this manner remove voltage from solenoid SOL–9 allowing valve 35 (FIG. 10) to return to the position shown on FIG. 10 and supplying air pressure in a direction to open the cover 51. Simultaneously, this removes pressure from the double pressure switch 39, 41. As soon as pressure switch 39 has opened the operator may release push buttons 63 and 64 and the circuit to solenoid SOL–9 will remain open and the cover will be caused to remain open. The closing of pressure switch 41 completes the interlocking of relay 6CR so that once more it will remain energized and prevent operation of the machine until both chucks are again closed for the next cycle.

The above circuits and mechanical arrangement are not dependent on the use of pneumatic actuators but would work equally well with hydraulic or other types of actuators.

Various modifications of the friction welder control arrangements illustrated and described which are within the spirit and scope of the invention will occur to persons skilled in the art.

What is claimed is:

1. In combination with a friction welder including a voltage-responsive pressure regulating device, a control system for supplying to said device a series of selected direct current voltages such as to provide optimum operation of the welder in all phases of an automatic welding cycle including a slope period in which one of the supplied voltages gradually increases from zero to its selected value, said system including an A.C. voltage source, an external signal source, a plurality of transformers preset to different values, an adjustable resistor, a rectifier having one set of terminals normally connected separately to said A.C. source through said transformers and having D.C. voltage terminals which in the period prior to start of slope are connected through said adjustable resistor to said device, and switching means responsive to signals from said external source to switch the connections of said one set of bridge terminals in that period to receive full voltage directly from said A.C. source, instead of through one of said transformers, with the result that the adjustment of said adjustable resistor determines the maximum pressure that can be applied by the regulating device prior to start of the slope period.

2. The combination of claim 1, in which said adjustable resistor is utilized for providing a desired ambient level of voltage applied to said device, and the switching of the connections of said one set of terminals to receive full voltage directly from said A.C. source in the period prior to slope, instead of through one of said transformers, makes the ambient adjustment in that period independent of the setting of said transformers.

3. In combination with a friction welder including a votlage-responsive regulating device for applying thrust pressure to the workpieces being welded, a control system for supplying to said regulating device a series of selected direct current voltages such as to provide optimum pressure operation of said welder during the preheating and heating phases of a welding cycle including a slope period in which one of the supplied voltages is gradually increased from zero to a selected value, said system including a source of A.C. voltage, a plurality of transformers having different settings of predetermined value, a voltage divider and a rectifier bridge having two sets of terminals which in said slope period are respectively connected to the A.C. voltage source through one of said transformers and through a variable portion of said voltage divider to said device, the resistance values of the several parts of said voltage divider and the location of these parts with respect to said device being selected to limit the voltage applied thereto, and thus the heating phase pressure in the slope period to a safe value which will avoid damage to the welder apparatus and the workpieces during the welding operation.

4. In combination with a friction welder including a solenoid-controlled hydraulic regulating valve for electrically controlling the thrust pressure applied to the weld interface of the workpieces being welded together, a control system for supplying to said valve a series of selected direct current voltages such as to provide optimum pressure operation of the welder in an automatic welding cycle, switching means responsive to a pressure transient created by the initial physical contact of the workpieces to start the automatic welding cycle, thereby making the repeatability of the cycle independent of variations in the length of the individual workpieces prior to welding, and timing means controlled by said switching means and actuated to return said switching means to the initial operating condition at the end of the welding cycle.

5. In combination with a friction welder including a voltage-responsive pressure regulating device, a control system for supplying to said device a series of selected direct current voltages such as to provide optimum operation of the welder during all phases of a forward welding cycle including a slope period in which one of the supplied voltages is gradually increased from zero to its selected value, said system including a source of A.C. voltage, an external signal source, a plurality of voltage transformers preset to different predetermined values, a voltage divider with a variable connection, two rectifier bridges and a slope drive motor which when energized drives the variable connection of the voltage divider, one of said rectifier bridges during the slope period having its D.C. voltage terimnals connected through a portion of said voltage divider to said device, and its other terminals connected through a different one of two of said transformers to the A.C. voltage source, the other rectifier bridge having its input terminals normally connected through a third one of said transformers to said A.C. source and its D.C. terminals connected to the armature of said motor so as to energize it so that it operates to drive the voltage divider to adjust the output voltage applied to the control device between a minimum and maximum value at a rate determined by the preset value of A.C. voltage supplied to said other bridge, and switching means responsive to signals from said external source including a first relay means operating when the voltage divider reaches the end of its travel in one direction to switch the A.C. voltage to the motor driven bridge from the reduced voltage preselected on said other transformer to full line voltage from said A.C. source, for rapid reversal of the slope drive motor and cause it to be driven rapidly in the reverse direction to reset that motor for another welding cycle.

6. The system of claim 5, in which said system also includes an emergency stop control means, and said switching means includes a second relay means operating to reset the slope drive motor in the event that said emergency control means is operated to abort a weld during an automatic welding cycle after slope has started, and before said first relay means can operate.

7. In combination with a friction welder including a voltage-responsive device for electrically regulating the thrust pressure applied to the workpieces being welded together, a first chuck for holding a rotating one of said workpieces, a second chuck for holding a non-rotating one of said workpieces, a movable table for moving the second chuck into a load position required to start an automatic welding cycle, and the non-rotatable workpiece into and out of physical contact with the rotating workpiece, a control system including an external signal source and a first relay means controlled by said source for supplying to said device a series of selected direct current voltages such as to provide optimum operation of the welder in all phases of an automatic welding cycle, separate manual control means operating to provide jog control of the movement of the table, and thus of the second chuck, in respectively opposite directions, said separate control means being mutually dependent in their action, that is, when one is operated, the other is unoperated, and vice versa, and other relay means responsive to the external signal source for disabling both of the jog control means during the automatic welding cycle.

8. The combination of claim 7, in which the external signal source is a manual control means and means controlled thereby which when operated by the operator of the welder closes an energizing circuit for said first relay means only, if (a) both of said chucks are closed to firmly hold said rotating and non-rotating workpieces, respectively, and (b) the table is in loading position, thus providing a double interlock to insure that the table is in proper position and both chucks are closed prior to initiation of an automatic cycle.

9. In the friction welding system of claim 7, in which said first relay means are utilized in the automatic welding cycle to control the sequence of events therein to provide optimum pressure operation of the welding system and means are provided for automatically resetting said relay means to the initial operating condition at the end of each welding cycle, and restoring the table to its load position prior to the start of a repeat cycle.

10. In combination with a friction welder including a voltage-responsive device for electrically controlling the thrust pressure applied to the workpieces being welded, a first rotatable chuck for holding a rotating one of said workpieces, a second chuck for holding a non-rotating one of said workpieces, a movable table adapted for moving said second chuck into a loading position required to start an automatic welding cycle, and moving the non-rotating workpiece into and out of contact with the rotating workpiece, a control system for supplying to said device a series of selected direct current voltages such as to provide optimum pressure operation of the welder in the preheating and heating phases of the automatic welding cycle, said control system including a source of A.C. voltage, an external signal source, a plurality of transformers with different predetermined settings, an adjustable resistor, a voltage divider with a variable connection, two rectifier bridges, a D.C. motor having an armature which when energized from the D.C. terminals of one of said bridges drives the variable connection of the voltage divider between maximum and minimum values at a rate determined by the A.C. voltage supplied to the A.C. terminals of said one bridge, a first relay means responsive to signals from said external source for shifting the connections of said device to the D.C. terminals of the other bridge between said adjustable resistor, the variable portion of said voltage divider and a direct connection thereto at different time to provide the optimum operation of said device, and other relay means for automatically restoring said first relay means to the initial operating condition at the end of each welding cycle and restoring said table to the loading position before each repeat cycle.

11. In combination with a friction welder including a voltage-responsive device for electrically regulating the thrust pressure applied to the workpieces being welded, a first rotatable chuck for holding a rotating one of said workpieces, a second chuck for holding a non-rotating one of said workpieces, a movable table for moving the said second chuck into a load position required for an automatic welding cycle, a cover for said second chuck, switching means for closing said cover before said automatic welding cycle starts, cover locking means, electrical means responsive to the cover when it is in closed position to close said locking means, and electrical means under control of said operator for starting an automatic cycle when the cover is closed and locked into position to prevent injury to the operator and the equipment during the automatic operation of said welding cycle.

12. In combination with a friction welder including a first chuck for holding a first rotating workpiece, a second chuck for holding a second non-rotating workpiece in alignment with said rotating workpiece, a movable table for moving said second chuck to a loading position required for starting an automatic welding cycle of said welder, and moving said second workpiece into and out of physical contact with said first workpiece, a safety cover for said second chuck, cover locking means, first switching means for first opening said first chuck to allow insertion of said first workpiece therein and then to close said first chuck and to lock it into the closed position and to condition said second chuck for loading said second workpiece therein, second switching means to close said second chuck with said second workpiece loaded therein and to lock it in closed position, a third switching means for closing said safety cover on the loaded second chuck, electrical means operated by the closing of said cover for operating the cover locking means for locking the cover into the closed position to protect the user and welder equipment in the following automatic welding cycle; and means controlled by the operator at the end of the welding cycle for opening said cover, said cover locking means and both of said chucks so that the welded workpieces may be taken out of said chucks.

13. The combination of claim 12, in which the third switching means and the means for closing and opening the cover are the same means which when operated by the user condition the controlled circuits for reverse movement of said cover by their next operation.

14. The combination of claim 12, in which to provide for accomplishing the closing and opening of said cover with a maximum of safety to the operator and to the equipment of said welder, the means for accomplishing it requires two-handed operation by said operator and is located with respect to said cover and chucks so that the operator is physically out of the way of said second chuck while it is being closed and opened by said cover.

15. The combination of claim 12, and in which if for some reason during the operating cycle a loss of electrical power should occur, the entire operation is maintained in a safe condition by an arrangement of the operating equipment to maintain a clamping action after the operating voltage is removed from that equipment.

16. The combination of claim 12, in which should the second chuck operating pressure be lost during the operation of the welding cycle, the second chuck is maintained in the closed position by means of the cover locking means.

17. The combination of claim 12, in which means are provided for preventing the second chuck from being opened or closed under control of the operator until the first chuck has been properly closed, and for preventing the automatic welding cycle from being started until after both chucks have been closed to firmly hold the respective workpieces.

18. The combination of claim 12, in which said first switching means includes a manual switch, a source of power, two voltage-responsive valves and a power cylinder, the operation of said manual switch by the operator of the welder controlling said voltage-responsive switches to supply power from said power source to said first chuck to close it to hold said first workpiece, and to said power cylinder causing it to condition said second chuck for loading said second workpiece therein.

19. The combination of claim 12, in which said third switching means includes two manual switches, a source of pneumatic power, three voltage-responsive valves and three power cylinder means, the momentary operation of said two manual switches simultaneously by said operator causing the actuation of said voltage-responsive valves to cause air pressure from said pneumatic source to be supplied to each of said power cylinder means in sequence to in turn close said cover on said second chuck, to actuate said cover locking means and to close said second chuck to hold said second workpiece firmly therein, and said means controlled by the operator at the end of the welding cycle for opening said cover and the cover locking means comprises the same two switches operated in the same manner to control the same apparatus in reverse order, the connection of said switches being arranged so that the return thereof to the unoperated condition at the end of the first momentary operation conditions the controlled apparatus for the reverse operation by their second simultaneous operation.

References Cited by the Examiner

UNITED STATES PATENTS

| | | | |
|---|---|---|---|
| 2,981,287 | 4/1961 | Caslow | 137—625.64 |
| 2,993,511 | 7/1961 | Johnson | 137—625.64 |
| 3,134,278 | 5/1964 | Hollander et al. | 228—2 |
| 3,162,068 | 12/1964 | Hardy | 228—2 |
| 3,188,047 | 6/1965 | Criffield | 137—625.64 |

JOHN F. CAMPBELL, *Primary Examiner.*

M. L. FAIGUS, *Assistant Examiner.*